United States Patent [19]

Posso

[11] Patent Number: 4,836,376
[45] Date of Patent: Jun. 6, 1989

[54] CASE OF MOLDED SYNTHETIC MATERIAL FOR FLAT, THIN OBJECTS

[75] Inventor: Patrick P. Posso, Lausanne, Switzerland

[73] Assignee: Gefitec S.A., Switzerland

[21] Appl. No.: 260,240

[22] Filed: Oct. 20, 1988

[30] Foreign Application Priority Data

Dec. 8, 1987 [CH] Switzerland ................ 4780.87

[51] Int. Cl.⁴ .................................. B65D 85/57
[52] U.S. Cl. ....................... 206/45.23; 220/337; 220/339; 206/444; 206/425
[58] Field of Search .............. 220/337, 339; 206/45.2, 206/45.23, 444, 425

[56] References Cited

U.S. PATENT DOCUMENTS

| | | | |
|---|---|---|---|
| 1,461,656 | 7/1923 | Harned | 206/45.23 |
| 4,368,817 | 1/1983 | Temesvary | 220/337 |
| 4,615,445 | 10/1986 | Stocchiero | 206/45.23 X |
| 4,634,001 | 1/1987 | Wakelin | 206/45.23 X |
| 4,676,372 | 6/1987 | Rager | 206/45.23 |
| 4,708,239 | 11/1987 | Bourbon | 206/45.23 |
| 4,776,457 | 10/1988 | Ferraroni | 206/45.23 |
| 4,801,004 | 1/1989 | Egly et al. | 220/339 X |

FOREIGN PATENT DOCUMENTS

| | | | |
|---|---|---|---|
| 926597 | 4/1947 | France | 206/45.23 |
| 1106517 | 7/1955 | France | 206/45.23 |
| 434751 | 9/1935 | United Kingdom | 206/45.23 |
| 678168 | 8/1952 | United Kingdom | 206/45.23 |

*Primary Examiner*—William Price
*Attorney, Agent, or Firm*—Kane, Dalsimer, Sullivan, Kurucz, Levy, Eisele and Richard

[57] ABSTRACT

The case consists of a box 1 integrally molded with a retaining member 2 joined to the box 1 by a portion 8 of reduced thickness which forms a hinge, and of a lid 3 pivoted about an axis 16 on the box 1. The face 12 of the lid has an interruption such that it can pivot through an angle greater than 270° on the box in order to form a support for the latter in the inclined open position. The turning movement of the retaining member is limited by a slot or aperture 18 in which is engaged a pin 16 which may at the same time be the articulation axis of the lid.

2 Claims, 2 Drawing Sheets

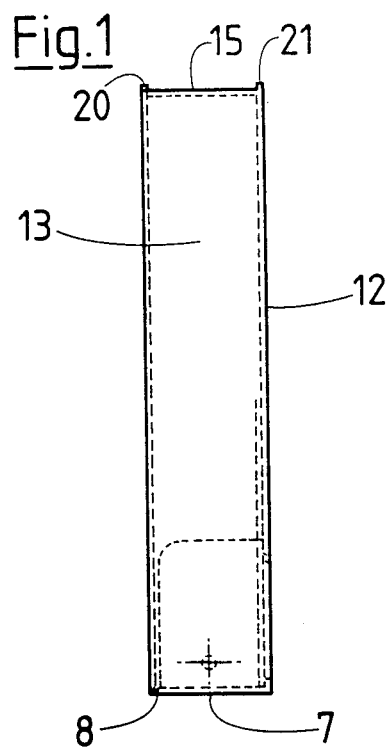
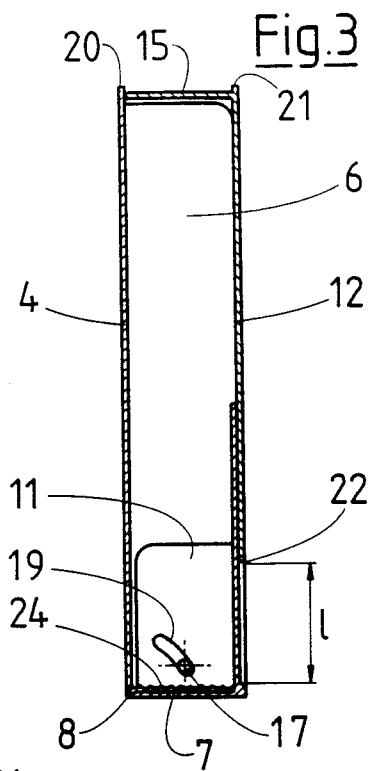
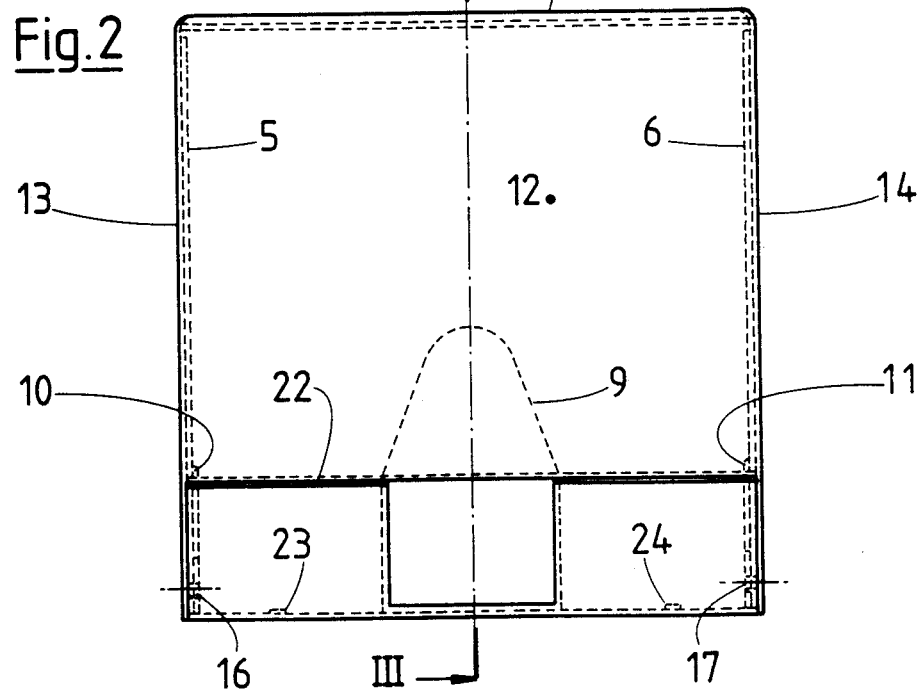

CASE OF MOLDED SYNTHETIC MATERIAL FOR FLAT, THIN OBJECTS

FIELD OF THE INVENTION.

The present invention relates to a case of molded synthetic material for flat, thin objects, such as disks, fiches or cards, comprising a box which is intended to receive the flat objects and to which is pivoted a part intended to close the box and to serve as support for the latter in the open, oblique position, and also a retaining member hinged on one side of the box to enable the flat objects to be fanned out for consultation, the turning movement of said retaining member being limited on each side of the box by the interaction of a pin and a slot or aperture.

PRIOR ART

A case of this type is described in the U.S. Pat. No. 4,634,001. This case is in the form of a receptacle containing a drawer forming the actual box. The receptacle has two profiled lateral protuberances cooperating with two slide guides formed in the drawer to enable the receptacle to turn relative to the drawer, while remaining attached to the latter, so that the receptacle and the drawer can stand up in an inverted V position, while the retaining member enabling the diskettes contained in the case to be fanned out consists of an attached member pivoted on the front face of the drawer, the turning movement of this retaining member being limited by apertures which are provided in the sides of the drawer and in which are engaged pins formed on the retaining member. This case is therefore composed of three main parts, to which must be added the hinge connecting the retaining member to the drawer. The drawer and its receptacle are relatively complicated parts. Placing them in the open standing position requires a relatively delicate operation to ensure that the top of the drawer bears correctly against the top edge of the receptacle. The whole article is not very stable. This document also describes a second embodiment in which a kind of locking action is provided between the drawer and its receptacle in the open position, but this is achieved at the cost of greater complexity.

A diskette case seeking to serve the same purpose is described in the document WO 86/06866. This case is composed of three parts, namely a box and its lid, which is integrally molded with the box, and contains a support formed of two parts pivotally connected together to allow the fanning out of the packet of diskettes contained in the case. This fanning out is permitted by a relatively complicated system of slide guides and articulations.

The document EP-A-210 368 discloses another diskette case consisting of a box, an attached lid hinged on on said box, and a retaining member hinged on the lid. The combination of the two articulations enables the packet of diskettes to be fanned out in a relatively stable position.

Another three-piece box is described in the document U.S. Pat. No. 4,615,445. This box has a lid and a retaining member which are pivotable about a common axis. The lid can pivot more than 270° to serve as support for the open box.

The present invention seeks to provide a case which is simpler than known cases, and which permits rapid, reliable opening by a simple manipulation and has great stability in the open position

SUMMARY OF THE INVENTION

The case according to the invention is defined in that the part intended for closing the box is in the form of a lid which is pivoted on the box and whose face is interrupted at its pivotally connected end so that the lid can pivot about its pivot joint through an angle greater than 270°, while in the open position the box comes to bear against the edge of the interruption in the face of the lid, in such a manner that with the lid lying horizontally the box is supported in an oblique position, and further defined in that the box and the retaining member are integrally molded, the articulation of these two parts being formed by a reduction of the thickness of the material.

This case is very simple. Not only is it composed of only two parts, but these parts require neither slide guides nor complicated articulations. By means of a single pivot it is possible to achieve simultaneously the articulation of the lid on the box and the limitation of the turning movement of the retaining member. In addition, the hinge formed by the reduction of the thickness of the material between the box and the retaining member provides, through being molded flat, an elasticity which tends to open the retaining member, that is to say to fan out the packet of diskettes. The manipulation of this case is also very simple.

BRIEF DESCRIPTION OF THE DRAWINGS.

The accompanying drawings illustrate by way of example one embodiment of the invention.

FIG. 1 is a side view of the case in the closed, upright position.

FIG. 2 is a front view thereof.

FIG. 3 is a view in section on the line III—III in FIG. 2.

Figure 4:
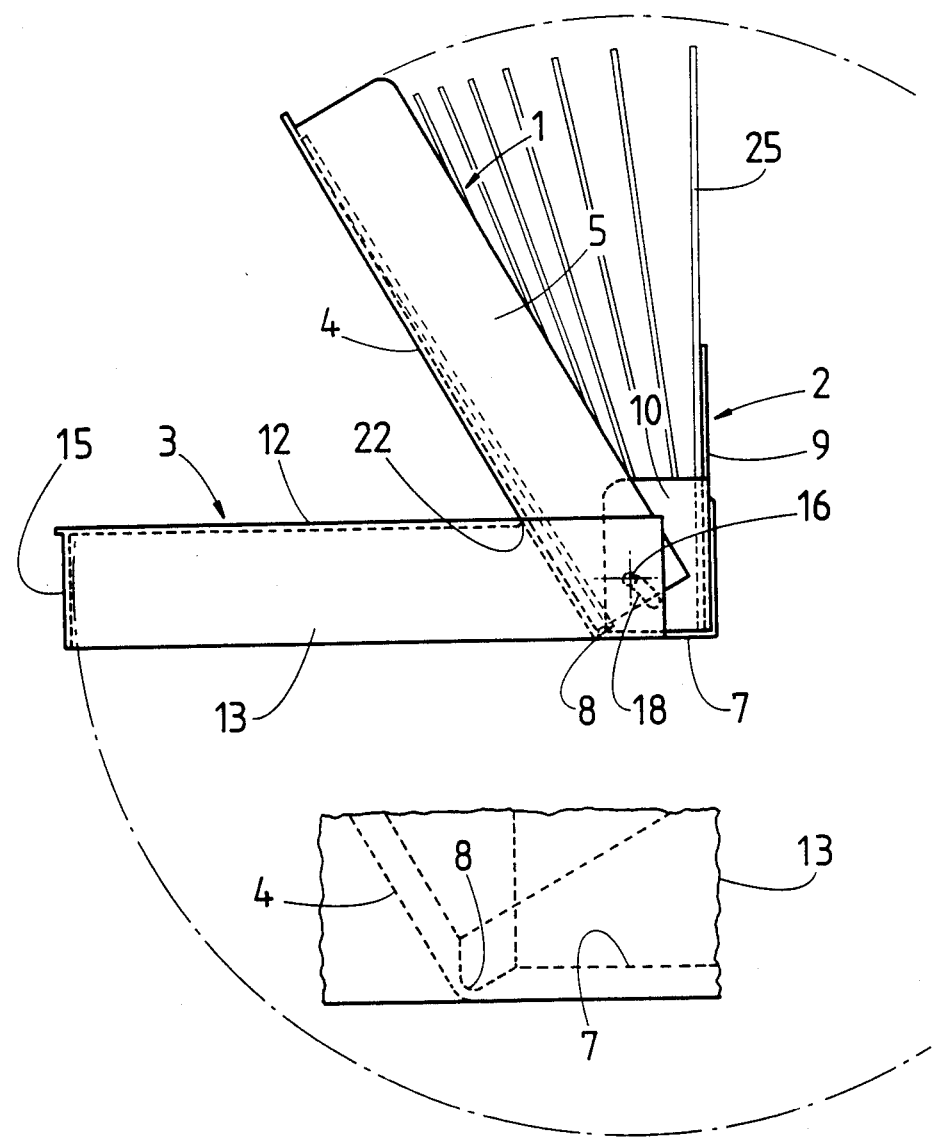
FIG. 4 shows the case in the open position.

DESCRIPTION OF THE PREFERRED EMBODIMENT.

The case shown is intended in particular for receiving compact disks, or more precisely ten sleeves each containing one compact disk. This case is intended to replace the indivdiual cases which have been used up to the present time for compact disks and which are relatively expensive, cumbersome and awkward to manipulate.

The case illustrated comprises a box 1 integrally molded with a retaining member 2, together with a lid 3 pivoted on the box 1. The box 1 has a bottom 4 and only two side walls 5 and 6. The retaining member 2 has a bottom 7 joined to the bottom 4 of the box by a portion 8 of reduced thickness forming a hinge. During the molding operation the bottoms 4 and 7 are in the same plane. The retaining member 2 also has a front wall 9 and two side walls 10 and 11 engaged between the walls 5 and 6 of the box.

The lid 3 has a face 12, two side walls 13 and 14 and a back wall 15. Starting from the back wall 15, the face 12 does not extend to the other end of the lid, but stops at a distance l from that end equal to 35 millimeters for a length of the face of 150 millimeters.

The side walls 13 and 14 of the lid are provided with cylindrical pins 16 and 17 passing respectively through the side walls 5 and 6 of the box 1 and engaging respectively in two apertures 18 and 19 having the shape of an arc of a circle, which are formed in the side walls 10 and 11 of the retaining member 2. The pins 16 and 17 thus serve simultaneously as pivots for the articulation of the lid 3 on the box 1 and as members limiting the turning of the retaining member 2 in relation to the box 1.

In order to open the case, it is sufficient to move apart the projecting edges 20 and 21 of the box and lid, and to turn the lid 3 about 300° relative to the box 1, so as to turn the lid over into the horizontal position shown in FIG. 4. In this position the lid 3 serves as support or stand for the box 1, which then bears against the inner edge 22 of the face 12 of the lid 3. It is then possible to open out the disks 25 fanwise between the bottom 4 of the lid and the front wall 9 of the retaining member 2. The opening of the retaining member 2 is limited by the ends of the apertures 18 and 19, against which the pins 16 and 17 come to bear. It should be noted that the remanent elasticity of the hinge 8, which was molded flat, tends to open the retaining member 2. The apertures 18 and 19 also limit the turning of the retaining member 2 in the closed position, so that its front wall 9 takes up position parallel to the lid 3.

The inner face of the wall 7 of the retaining member has its thickness increased by two corrugated bands 23 and 24 which form depressions and are intended to maintain a certain spacing of the bases of the disk sleeves, in order to facilitate their fanning out.

The case according to the invention is distinguished by the simplicity of its construction, and in particular by the simplicity of the means employed to hold the box in a stable oblique open position.

The case described above is obviously capable of some variations of its construction without departing from the scope of the invention. In particular, the lid could be pivoted on the box with the aid of pivots fastened to the box and engaging in apertures provided in the side walls of the lid. In this case the geometrical axis of the articulation of the lid on the box need not necessarily coincide with the axis of the pins cooperating with the apertures in the retaining member, and consequently the positions of the apertures and pins could be transposed, that is to say the apertures could be provided in the side walls of the box. The apertures could obviously be replaced by slots.

I claim:

1. A case of molded synthetic material for flat, thin objects, such as disks, fiches or cards, comprising a box (1) which is intended to receive the flat objects and to which is pivoted a part (3) intended to close the box and to serve as support for the box in the open, oblique position, and also a retaining member (2) hinged on one side of the box to enable the flat objects to be fanned out for consultation, the turning movement of said retaining member (2) being limited on each side of the box by the interaction of a pin and a slot or aperture, wherein the part (3) intended for closing the box (1) is in the form of a lid which is pivoted on the box and whose face (12) is interrupted at its pivotally connected end so that the lid can pivot about its pivot joint through an angle greater than 270°, while in the open position the box (1) comes to bear against the edge (22) of the interruption in the face of the lid, in such a manner that with the lid lying horizontally the box (1) is supported in an oblique position, and wherein the box (1) and the retaining member (2) are integrally molded, the articulation of these two parts being formed by a reduction (8) of the thickness of the material.

2. A case as claimed in claim 1, wherein the lid (3) has two side walls (13, 14) provided with pivots (16, 17) passing through the side walls of the box (1) and at the same time constituting said pins cooperating with said slots of apertures (18, 19) formed in two side walls of the retaining member.

* * * * *